United States Patent
Kamada

(10) Patent No.: US 7,978,165 B2
(45) Date of Patent: Jul. 12, 2011

(54) LIQUID CRYSTAL DISPLAY DEVICE, METHOD FOR REPAIRING LIQUID CRYSTAL DISPLAY DEVICE, AND METHOD FOR DRIVING LIQUID CRYSTAL DISPLAY DEVICE

(75) Inventor: Tsuyoshi Kamada, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 1073 days.

(21) Appl. No.: 11/063,081

(22) Filed: Feb. 22, 2005

(65) Prior Publication Data

US 2006/0017674 A1  Jan. 26, 2006

(30) Foreign Application Priority Data

Jul. 20, 2004  (JP) ................................ 2004-211701

(51) Int. Cl.
*G09G 3/36* (2006.01)

(52) U.S. Cl. .......................................... 345/92; 349/55

(58) Field of Classification Search .................. 345/50, 345/55, 67, 76, 87–95; 349/54, 55, 192
See application file for complete search history.

(56) References Cited

U.S. PATENT DOCUMENTS

| | | | | |
|---|---|---|---|---|
| 4,431,271 A * | 2/1984 | Okubo | ............................. | 349/42 |
| 5,303,072 A * | 4/1994 | Takeda et al. | .................... | 349/48 |
| 5,623,350 A * | 4/1997 | Kawachi et al. | ................. | 349/38 |
| 5,745,090 A * | 4/1998 | Kim et al. | ........................ | 345/90 |
| 6,031,328 A * | 2/2000 | Nakamoto | ..................... | 313/495 |
| 6,456,267 B1 * | 9/2002 | Sato et al. | ......................... | 345/92 |
| 6,753,839 B2 * | 6/2004 | Fujita | ............................... | 345/92 |
| 6,882,375 B2 * | 4/2005 | Kim | ................................. | 349/43 |
| 6,977,681 B1 * | 12/2005 | Sasai | ............................. | 348/241 |
| 7,038,675 B2 * | 5/2006 | Kawamura et al. | ............ | 345/211 |
| 7,102,673 B2 * | 9/2006 | Kimura | .......................... | 348/246 |
| 7,253,851 B2 * | 8/2007 | Lee et al. | ......................... | 349/55 |
| 2001/0022571 A1 * | 9/2001 | Nakano et al. | ................... | 345/98 |
| 2002/0154079 A1 * | 10/2002 | Shiota et al. | .................... | 345/87 |
| 2004/0046919 A1 * | 3/2004 | Kim | ................................ | 349/141 |

FOREIGN PATENT DOCUMENTS

| | | |
|---|---|---|
| JP | 5-27262 | 2/1993 |
| JP | 6-3694 | 1/1994 |
| JP | 7-20829 | 1/1995 |
| JP | 9-127549 | 5/1997 |
| JP | 11-282007 | 10/1999 |
| JP | 11-305260 | 11/1999 |
| JP | 2001-56652 | 2/2001 |
| JP | 2001-305500 | 10/2001 |

* cited by examiner

*Primary Examiner* — Chanh Nguyen
*Assistant Examiner* — Pegeman Karimi
(74) *Attorney, Agent, or Firm* — Greer, Burns & Crain, Ltd.

(57) ABSTRACT

A method for repairing a liquid crystal display device comprises: a plurality of pixels arranged in a matrix, adjacent to each other row-wise and column-wise; a plurality of first bus lines extended row-wise and connected to the pixels arranged row-wise; a plurality of second bus lines extended column-wise and connected to the pixels arranged column-wise; and a plurality of third bus lines extended row-wise, connected to the pixels arranged row-wise. The plurality of the pixels each includes: a pixel electrode; a first switching element connected to the pixel electrode and the second bus line, for controlling the connection between the pixel electrode and the second bus line by the first bus line; and a second switching element having one electrode connected to the second bus line and the other electrode arranged, overlapping the pixel electrode with an insulating film formed there between, for controlling the connection between said one electrode and said the other electrode by the third bus line.

15 Claims, 14 Drawing Sheets

LIQUID CRYSTAL DISPLAY DEVICE, METHOD FOR REPAIRING LIQUID CRYSTAL DISPLAY DEVICE, AND METHOD FOR DRIVING LIQUID CRYSTAL DISPLAY DEVICE

CROSS-REFERENCE TO RELATED APPLICATIONS

This application is based upon and claims the benefit of priority from the prior Japanese Patent Application No. 2004-211701, filed on Jul. 20, 2004, the entire contents of which are incorporated herein by reference.

BACKGROUND OF THE INVENTION

The present invention relates to a liquid crystal display device, more specifically, a liquid crystal display device which allows a defective pixel to be repaired to be normal, a method for repairing the liquid crystal display device, and a method for driving the display device.

A liquid crystal display device makes image displays by applying electric fields to a liquid crystal layer sandwiched between glass substrates to change an alignment direction of the liquid crystal to thereby change optical property of the liquid crystal. Recently, TFT liquid crystal display devices, which control the voltage to be applied to the pixel electrodes arranged in a matrix by thin film transistors (TFTs), are dominant.

The TFT liquid crystal display device often has point defects due to operational defects of the thin film transistors which are the driving element. Causes for the operational defects of the thin film transistors are various, e.g., formation defects of the channel unit, the inter-layer short, the intra-layer short between the source and the drain, etc. and are problems which have not yet been solved.

The TFT liquid crystal display device has a large number of pixels arranged in a matrix, and it is very difficult to perfectly prevent the generation of such defects. Allowing defects of a part of the pixels to make the device as a whole effective lowers the product yield and resultantly increases the fabrication costs.

Various methods for repairing such point defects of the liquid crystal display have been proposed.

A first method is for making a point defect not a bright point but a dark point to thereby make the point defect inconspicuous.

The display mode of the liquid crystal is largely classified in normally white (NW) mode, in which the white color display is made with no voltage applied and normally black (NB) mode, in which black color display is made with no voltage applied. The typical mode of the NW mode is TN mode, and the typical modes of the NB mode are MVA and IPS.

In the NW mode, the black color state is made possible with a voltage being applied to the liquid crystal. This state can be realized by connecting, e.g., the source electrode to the gate bus line by laser repair. A minus potential for tuning off the TFTs is almost always applied to the gate bus line, which allows the liquid crystal to turn on.

Reversely, in the NB mode, the black color state is always made possible with no voltage being applied. This state can be realized by connecting, e.g., the pixel electrode and the auxiliary capacitor bus line by laser repair. The auxiliary capacitor bus line must have a stationary potential so as to stabilize the pixel potential and generally is connected to the common electrode to thereby have the same potential. Accordingly, the pixel electrode and the auxiliary capacitor bus line are interconnected, whereby the above-state can be realized.

The first method described above is disclosed in, e.g., Reference 1 (Japanese published unexamined patent application No. Hei 05-027262), Reference 2 (Japanese published unexamined patent application No. Hei 07-020829), Reference 3 (Japanese published unexamined patent application No. 2001-305500), etc.

In a second method, the luminance of a pixel having the point defect is interlocked with a luminance of pixels around said pixel to thereby make the point defect inconspicuous.

Specifically, patterns have parts overlapping each other between the drain bus line and the pixel electrode, and when a defect takes place, the drain bus line and the pixel electrode are interconnected by laser repair. The voltage of the drain bus line is always applied to the pixel electrode, whereby the point defect is substantially invisible when all the screen has the same gradation (all black color, all white color, all gray color or others) and considerably inconspicuous in a picture display.

Methods in which the picture electrode is connected to an adjacent picture electrode in place of the bus line are also proposed.

The second method described above is disclosed in, e.g., Reference 4 (Japanese published unexamined patent application No. Hei 09-127549), Reference 5 (Japanese published unexamined patent application No. Hei 11-282007), Reference 6 (Japanese published unexamined patent application No. Hei 11-305260), etc.

In a third method, a plurality of thin film transistors are provided, and when a point defect takes place, the thin film transistor is disconnected to thereby repair the point to be normal. For example, 2 thin film transistors are provided for the usual use, and when a point defect takes place, the defective thin film transistor alone is disconnected. Otherwise, 2 thin film transistors are provided, and one of them is actually connected to a pixel, and when a point defect takes place, the pixel is disconnected from the thin film transistor which has been used to be connected to the spare thin film transistor.

The third method described above is disclosed in, e.g., Reference 1, Reference 7 (Japanese published unexamined patent application No. Hei 06-003694), etc.

The other related arts are disclosed in, e.g., Reference 8 (Japanese published unexamined patent application No. 2001-056652), etc.

However, in the above-described first method for repairing the liquid crystal display device, although a dark point is less conspicuous than a luminous point, it cannot be said that such state is normal. Although a dark point is less conspicuous than a luminous point in black color display, actually, a dark point in white color display is conspicuous in green pixels, etc. and is a considerably conspicuous defect also in RGB monochromatic display, etc.

In the above-described second method for repairing the liquid crystal display device, in the display in which characters, etc. are displayed side by side, the display in which the screen is bisected vertically in white color and black color, a point defect can be a dark point or a luminous point, and the point defect is rather conspicuous.

Furthermore, when pixel electrodes adjacent to each other along the extension of the gate bus line are interconnected, these pixels are for displaying different colors. When an image mostly in one color is displayed, the pixel can be recognized as a point defect. When pixel electrodes adjacent to each other along the extension of the drain bus line are interconnected, the pixels are for the same color, which makes the point defect inconspicuous. However, in images, as of stripe patterns of every but one line, zigzag patterns, etc., the pixel appears as a point defect.

In either of the cases, in which adjacent pixel electrodes are interconnected, 2 pixels are driven by one thin film transistor. In terms of the writing capacitor and the parasitic capacitor, the displays of the pixels including the adjacent pixel tend to be abnormal. There is a risk that the defect of one pixel may be extended to the defect of the two interconnected pixels and worsened.

In the above-described third method for repairing the liquid crystal display, after paneled, the repair is made while watching at the underside, which has made it very difficult to judge which thin film transistor is defective. Which thin film transistor to be disconnected has had recourse to knack, and the success rate has been low. Furthermore, a normal point has 2 thin film transistors, but an abnormal has 1 thin film transistor. Depending on a display state, the defect is often visible.

In many cases, causes for the point defect take place in a small region. Even when 2 thin film transistors are provided for 1 pixel, it is very possible that the 2 thin film transistors may become simultaneously defective. As a countermeasure to this, it is an idea to space the 2 thin film transistors from each other. In such case, the area except that area of the display unit is increased, and the aperture ratio is much decreased.

SUMMARY OF THE INVENTION

An object of the present invention is to provide a liquid crystal display device which allows a point defect to be a perfectly normal point with a little aperture ratio decrease, a method for repairing the liquid crystal display device, and a method for driving the liquid crystal display device.

According to one aspect of the present invention, there is provided a liquid crystal display device comprising: a plurality of pixels arranged in a matrix, adjacent to each other row-wise and column-wise; a plurality of first bus lines extended row-wise and connected to the pixels arranged row-wise; a plurality of second bus lines extended column-wise and connected to the pixels arranged column-wise; and a plurality of third bus lines extended row-wise, connected to the pixels arranged row-wise, and being capable of applying a voltage which independently changes with time, said plurality of the pixels each including: a pixel electrode; a first switching element connected to the pixel electrode and the second bus line, for controlling the connection between the pixel electrode and the second bus line by the first bus line; and a second switching element having one electrode connected to the second bus line and the other electrode arranged, overlapping the pixel electrode with an insulating film formed therebetween, for controlling the connection between said one electrode and said the other electrode by the third bus line.

According to another aspect of the present invention, there is provided a liquid crystal display device comprising: a plurality of pixels arranged in a matrix, adjacent to each other row-wise and column-wise; a plurality of first bus lines extended row-wise and connected to the pixels arranged row-wise; a plurality of second bus lines extended column-wise and connected to the pixels arranged column-wise; and a plurality of third bus lines extended row-wise, connected to the pixels arranged row-wise, and being capable of applying a voltage which independently changes with time, said plurality of the pixels each including: a pixel electrode arranged, overlapping the third bus line with an insulating film formed therebetween; and a first switching element connected to the pixel electrode and the second bus line, for controlling the connection between the pixel electrode and the second bus line by the first bus line.

According to further another aspect of the present invention, there is provided a method for repairing a liquid crystal display device comprising: a plurality of pixels arranged in a matrix, adjacent to each other row-wise and column-wise; a plurality of first bus lines extended row-wise and connected to the pixels arranged row-wise; a plurality of second bus lines extended column-wise and connected to the pixels arranged column-wise; and a plurality of third bus lines extended row-wise, connected to the pixels arranged row-wise, and being capable of applying a voltage which independently changes with time, said plurality of the pixels each including: a pixel electrode; a first switching element connected to the pixel electrode and the second bus line, for controlling the connection between the pixel electrode and the second bus line by the first bus line; and a second switching element having one electrode connected to the second bus line and the other electrode arranged, overlapping the pixel electrode with an insulating film formed therebetween, for controlling the connection between said one electrode and said the other electrode by the third bus line, when one of said pixels is inoperative, laser beam is irradiated to a region where the pixel electrode of the inoperative pixel and said the other electrode of the second switching element overlapping with each other to thereby connect said pixel electrode and the second switching element with each other.

According to further another aspect of the present invention, there is provided a method for repairing a liquid crystal display device comprising: a plurality of pixels arranged in a matrix, adjacent to each other row-wise and column-wise; a plurality of first bus lines extended row-wise and connected to the pixels arranged row-wise; a plurality of second bus lines extended column-wise and connected to the pixels arranged column-wise; and a plurality of third bus lines extended row-wise, connected to the pixels arranged row-wise, and being capable of applying a voltage which independently changes with time, said plurality of the pixels each including: a pixel electrode arranged, overlapping the third bus line with an insulating film formed therebetween; and a first switching element connected to the pixel electrode and the second bus line, for controlling the connection between the pixel electrode and the second bus line by the first bus line, when one of said pixels is inoperative, laser beam is irradiated to a region where the pixel electrode of the inoperative pixel and the third bus line overlapping with each other to thereby connect said pixel electrode and the third bus line with each other.

According to further another aspect of the present invention, there is provided a method for driving a liquid crystal display device comprising: a plurality of pixels arranged in a matrix, adjacent to each other row-wise and column-wise; a plurality of first bus lines extended row-wise and connected to the pixels arranged row-wise; a plurality of second bus lines extended column-wise and connected to the pixels arranged column-wise; and a plurality of third bus lines extended row-wise, connected to the pixels arranged row-wise, and being capable of applying a voltage which independently changes with time, said plurality of the pixels each including: a pixel electrode; a first switching element connected to the pixel electrode and the second bus line, for controlling the connection between the pixel electrode and the second bus line by the first bus line; and a second switching element having one electrode connected to the second bus line and the other electrode arranged, overlapping the pixel electrode with an insulating film formed therebetween, for controlling the connection between said one electrode and said the other electrode by the third bus line, in the pixels which are normally operative, the first switching element being controlled by the first bus line to thereby write prescribed image information, and in the pixel which is not normally operative, the prescribed image information being written by controlling by the third bus line the second switching element having said the other electrode connected to the pixel electrode by laser repair.

According to further another aspect of the present invention, there is provided a method for driving a liquid crystal display device comprising: a plurality of pixels arranged in a matrix, adjacent to each other row-wise and column-wise; a plurality of first bus lines extended row-wise and connected to the pixels arranged row-wise; a plurality of second bus lines extended column-wise and connected to the pixels arranged column-wise; and a plurality of third bus lines extended row-wise, connected to the pixels arranged row-wise, and being capable of applying a voltage which independently changes with time, said plurality of the pixels each including: a pixel electrode arranged, overlapping the third bus line with an insulating film formed therebetween; and a first switching element connected to the pixel electrode and the second bus line, for controlling the connection between the pixel electrode and the second bus line by the first bus line, in the pixels which are normally operative, the first switching element is controlled by the first bus line to thereby write prescribed image information, and in the pixel which is not normally operative, the prescribed image information is written by the third bus line connected to the pixel electrode by laser repair.

According to the present invention, a defective pixel caused by an operational defect of a thin film transistor can be repaired to be a perfectly normal point with the aperture ratio decreased suppressed. The fabrication yield can be accordingly higher, and the fabrication cost can be accordingly decreased.

DETAILED DESCRIPTION OF THE INVENTION

A First Embodiment

The liquid crystal display device, the method for repairing the liquid crystal display device, and a method for driving the liquid crystal display device according to a first embodiment of the present invention, will be explained with reference to FIGS. 1 to 12.

Figure 1:
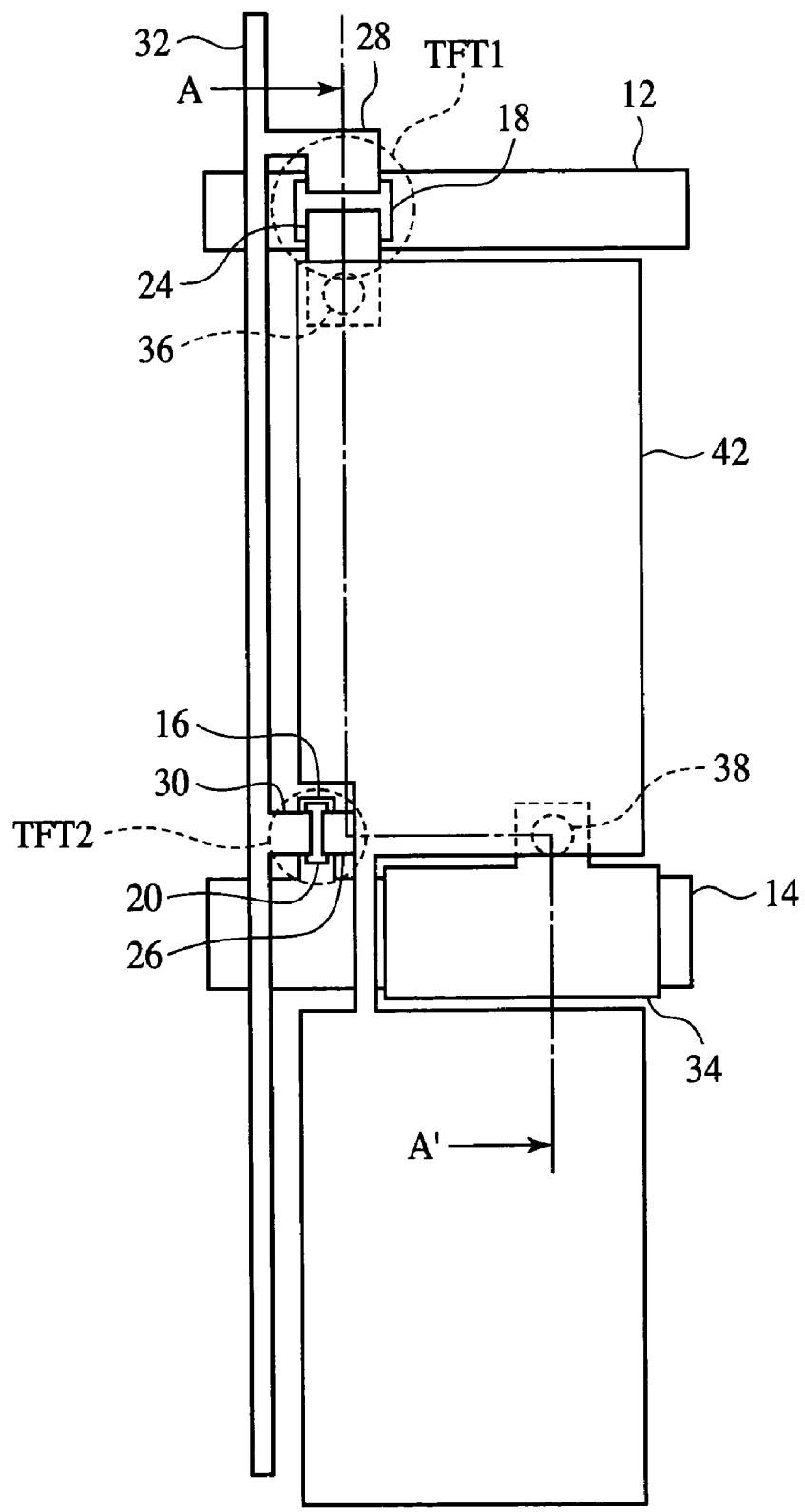
FIG. 1 is a plan view of the liquid crystal display device according to a first embodiment of the present invention, which shows a structure thereof.
Figure 2:
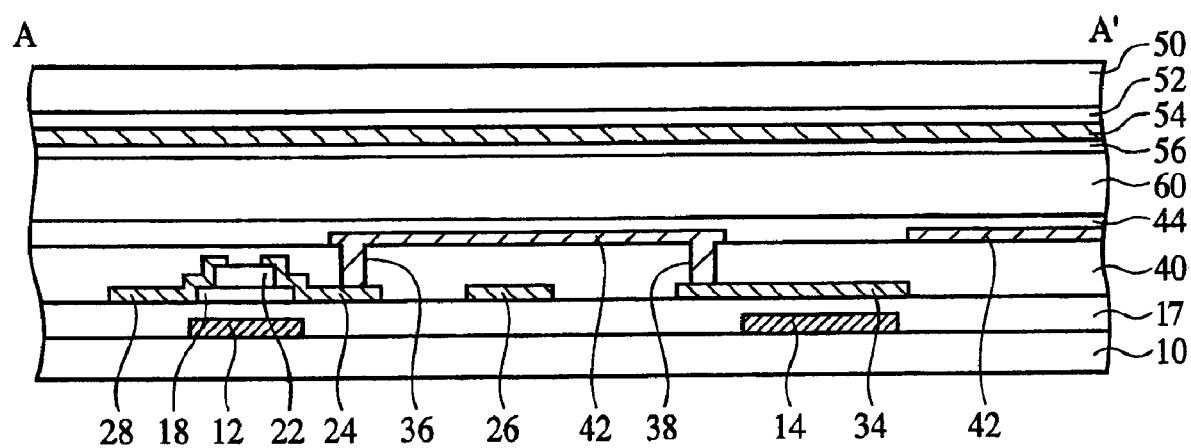
FIG. 2 is a diagrammatic sectional view of the liquid crystal display device according to the first embodiment of the present invention, which shows the structure thereof.
Figure 3:
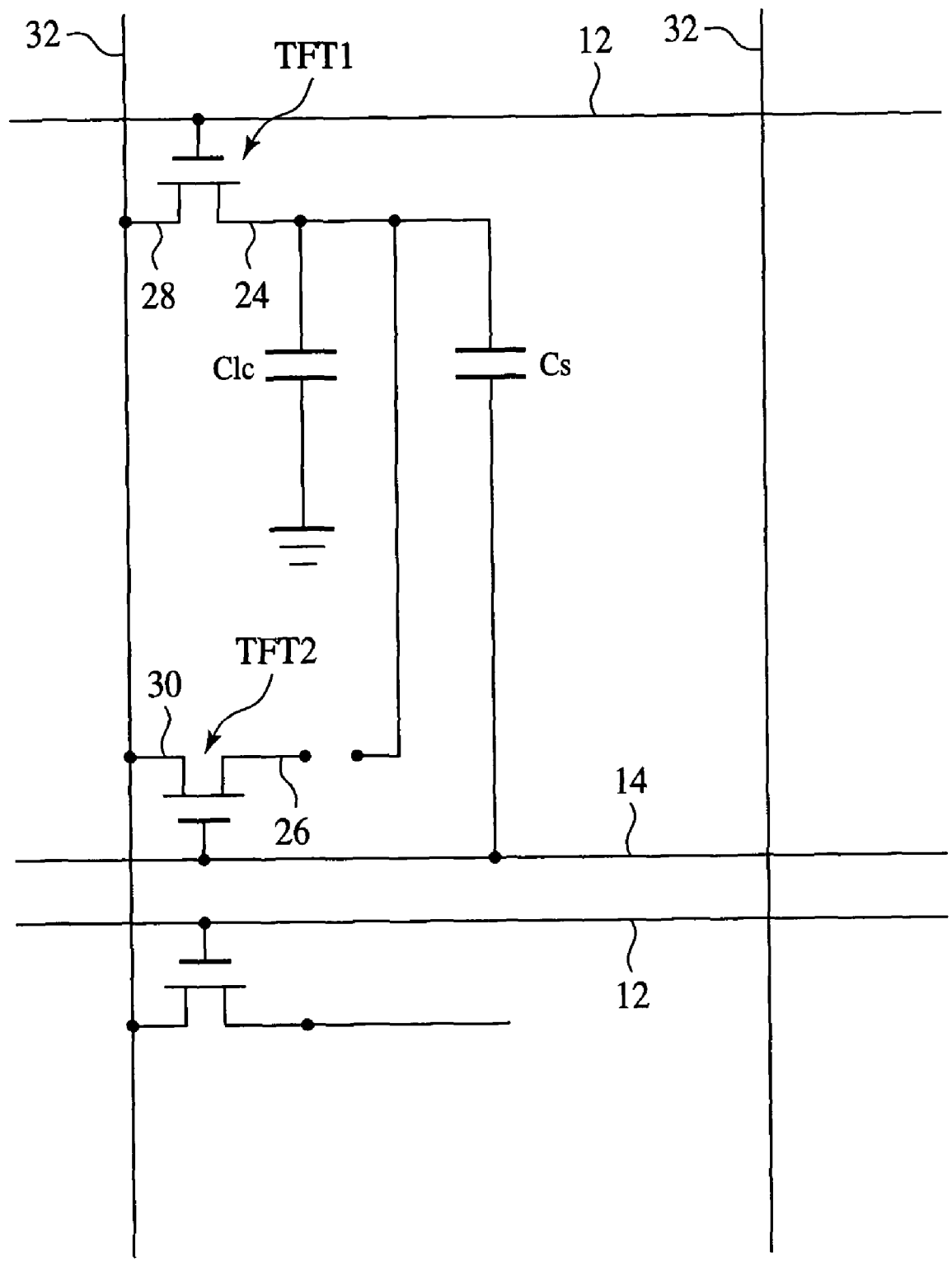
FIG. 3 is a circuit diagram of the liquid crystal display device before repaired according to the first embodiment of the present invention.
Figure 4:
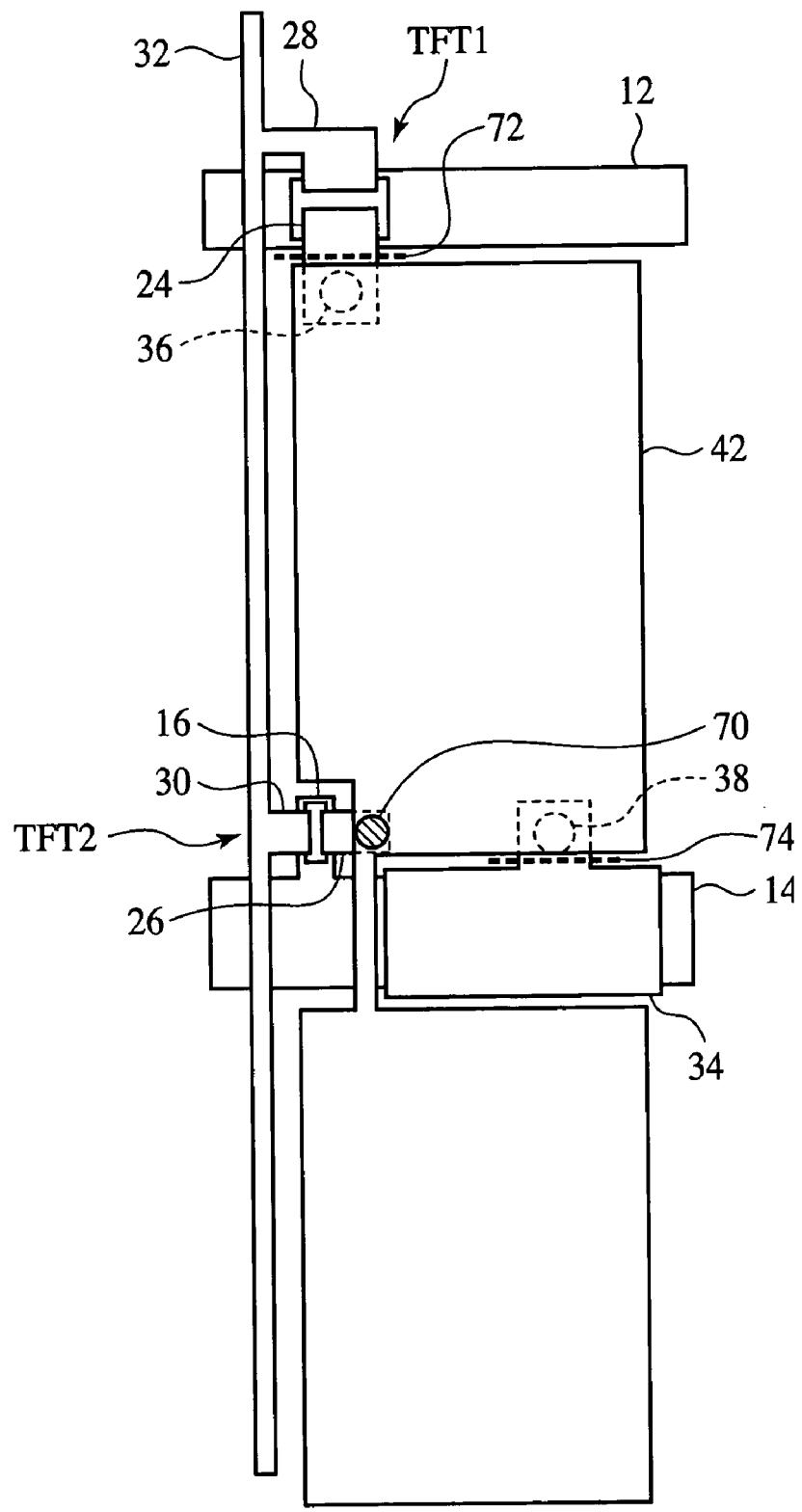
FIG. 4 is a plan view of the liquid crystal display device after repaired according to the first embodiment of the present invention, which shows the structure thereof.
Figure 5:
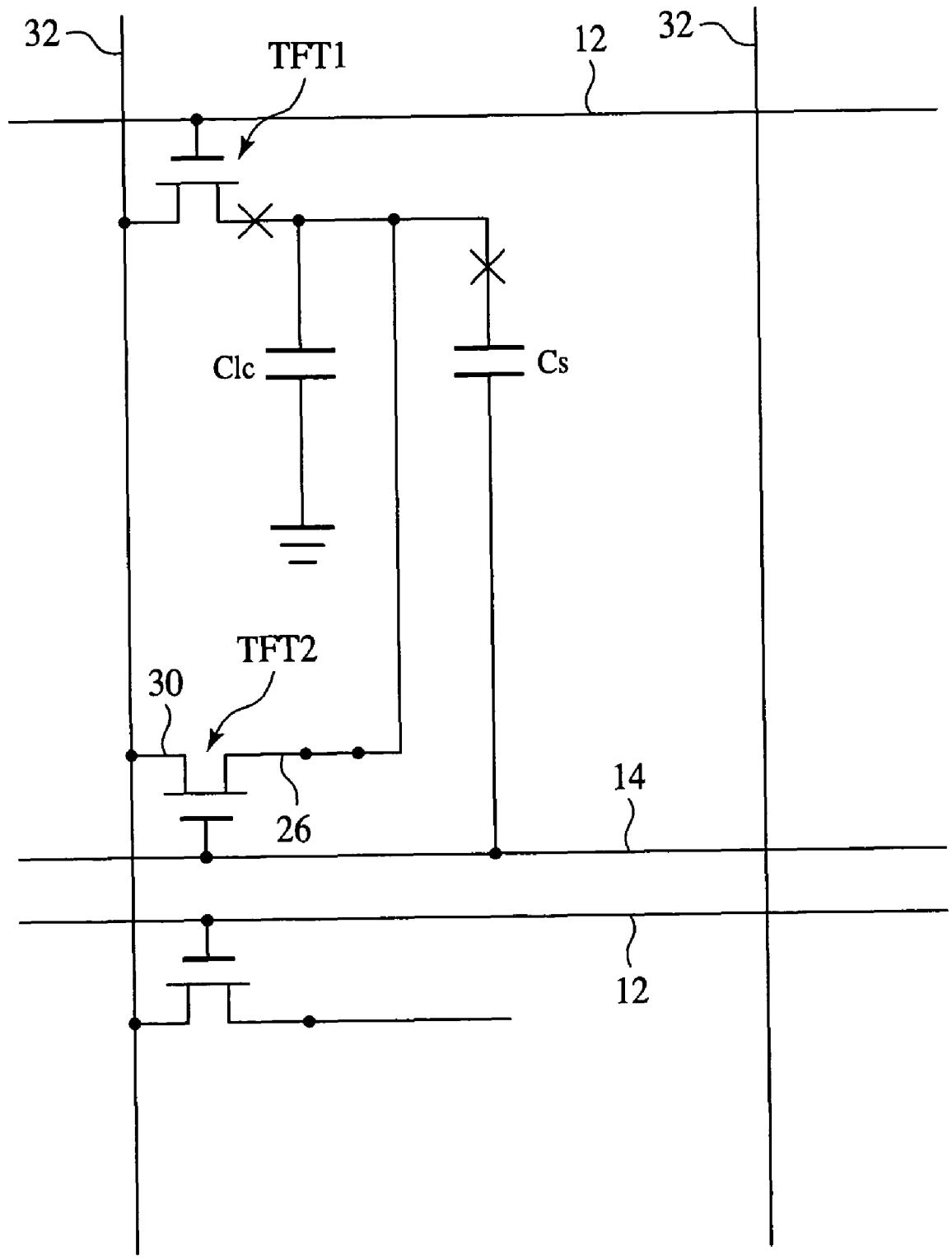
FIG. 5 is a circuit diagram of the liquid crystal display device after repaired according to the first embodiment of the present invention.
Figure 6:
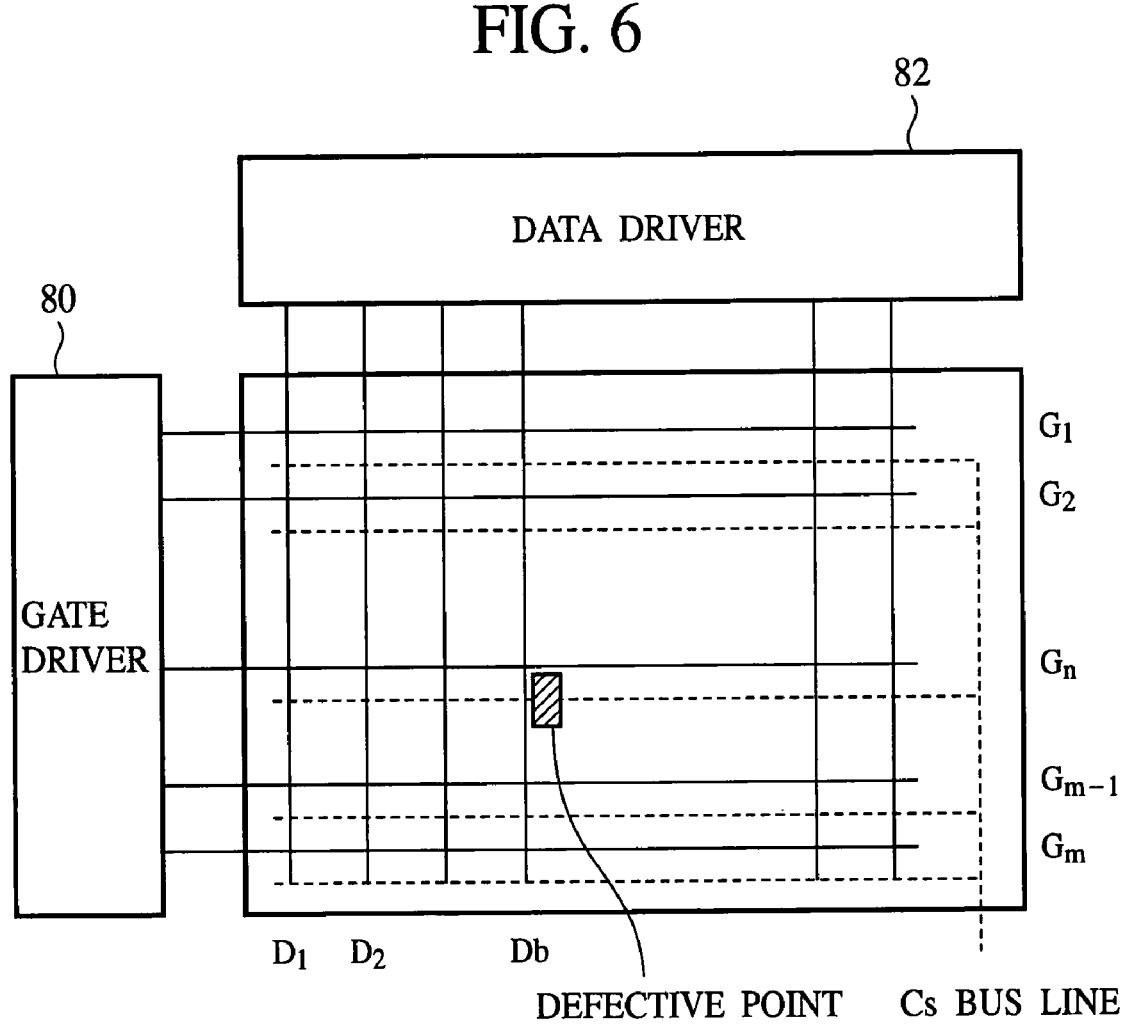
FIG. 6 is a plan view of the liquid crystal display device according to the first embodiment of the present invention, which shows the general constitution.
Figure 7:
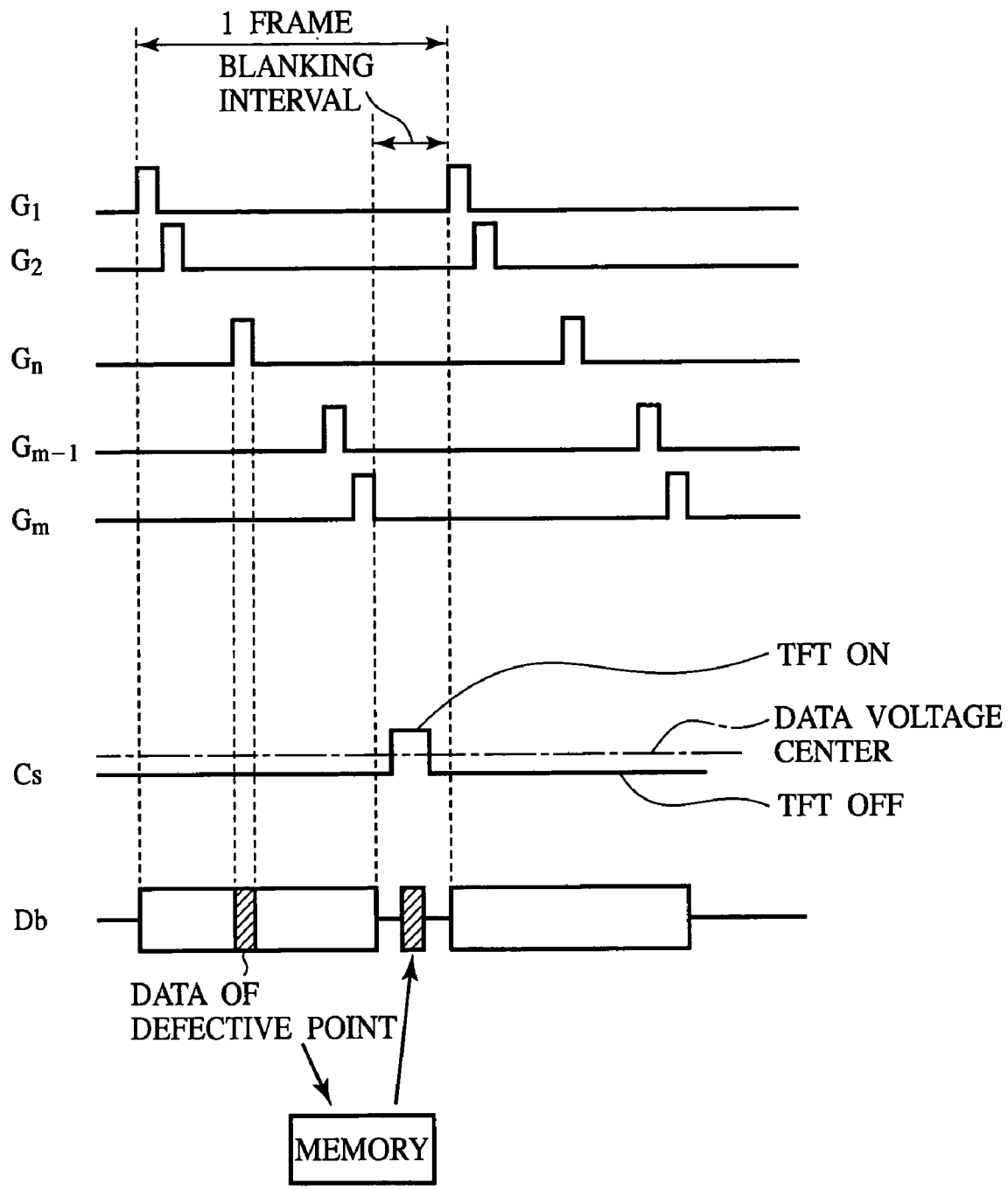
FIG. 7 is a time chart of the method for driving the liquid crystal display device according to the first embodiment of the present invention.
Figure 8:
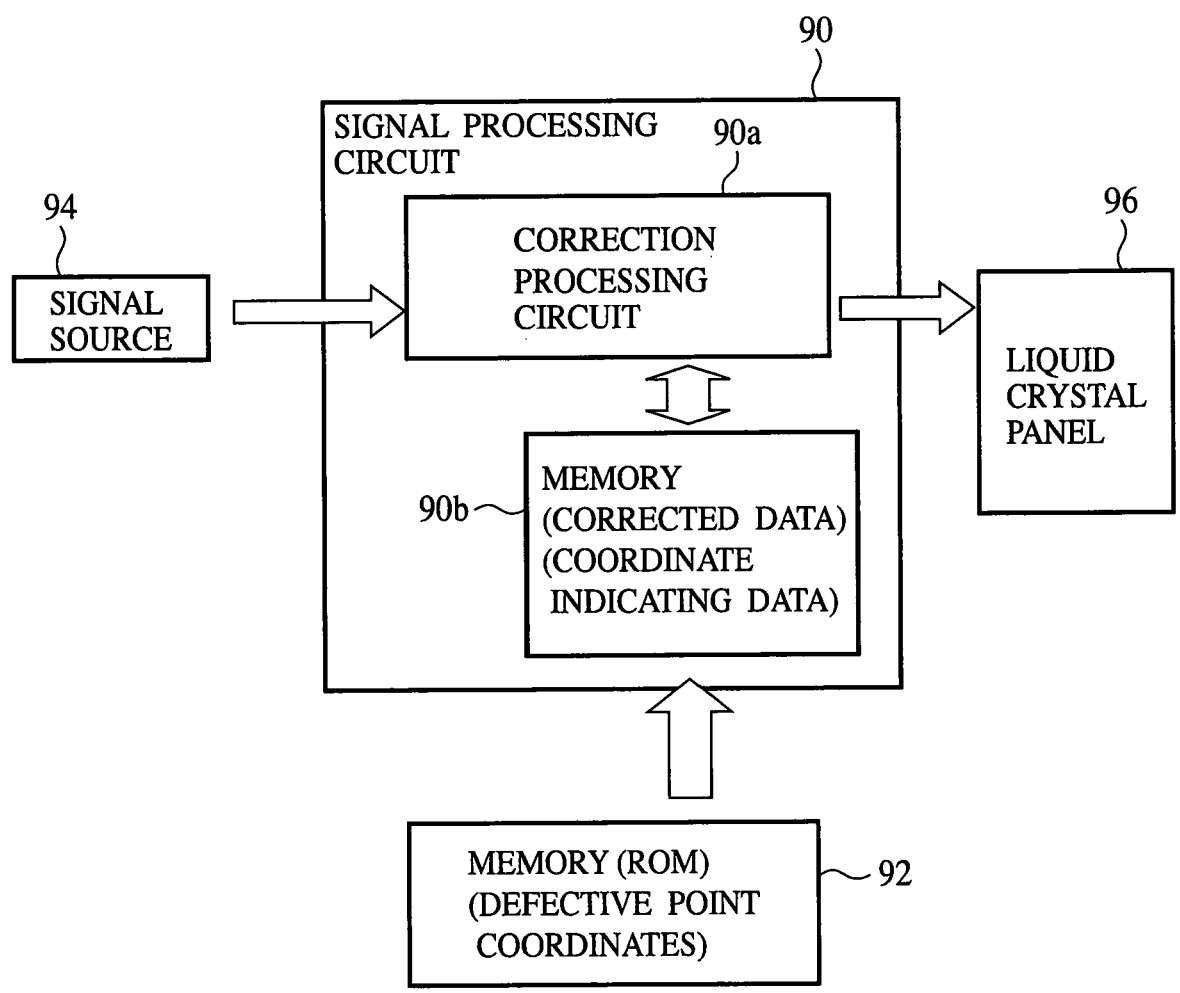
FIG. 8 is a block diagram of the data driver of the liquid crystal display device according to the first embodiment of the present invention.

FIG. 1 is a plan view of the liquid crystal display device according to the present embodiment, which shows a structure thereof. FIG. 2 is a diagrammatic sectional view of the liquid crystal display device according to the present embodiment, which shows the structure thereof. FIG. 3 is a circuit diagram of the liquid crystal display device before being repaired according to the present embodiment. FIG. 4 is a plan view of the liquid crystal display device after being repaired according to the present embodiment, which shows the structure thereof. FIG. 5 is a circuit diagram of the liquid crystal display device after being repaired according to the present embodiment. FIG. 6 is a plan view of the liquid crystal display device according to the present embodiment, which shows the general constitution. FIG. 7 is a time chart of the method for driving the liquid crystal display device according to the present embodiment. FIG. 8 is a block diagram of the data driver of the liquid crystal display device according to the present embodiment. FIGS. 9-12 are views showing the methods of connecting the auxiliary capacitor bus lines.

First, the structure of the liquid crystal display device according to the present embodiment will be explained with reference to FIGS. 1 to 3.

On a glass substrate 10, a gate bus line 12, and an auxiliary capacitor bus line 14 are formed, extended row-wise. As shown in FIG. 1, the gate bus line 12 and the auxiliary capacitor bus line 14 are formed, extended in the same direction. A part of the auxiliary capacitor bus line forms a gate electrode 16 of a thin film transistor (TFT2 in FIG. 1) which is different from a thin film transistor (TFT1 in FIG. 1) having a gate electrode formed of the gate bus line 12. A gate insulating film 17 is formed on the glass substrate 10 with the gate bus line 12 and the auxiliary capacitor bus line 14 formed on.

On the gate insulating film 17, an amorphous silicon layer 18 which is to be the channel of the thin film transistor TFT1 and an amorphous silicon layer 20 which is to be the channel of the thin film transistor TFT2 are formed. Channel protection layers 22 are formed on the amorphous silicon layers 18, 20.

On the gate insulating film 17 with the amorphous silicon layers 18, 20 and the channel protection layers 22 formed on, there are formed a source electrode 24 of the thin film transistor TFT1, a source electrode 26 of the thin film transistor TFT2, a drain electrode 28 of the thin film transistor TFT1, a drain electrode 30 of the thin film transistor TFT2, a drain bus line 32 continuous to the drain electrodes 28, 30, and the auxiliary capacitor electrode 34 formed over the auxiliary capacitor bus line 14. The drain bus line 32 is formed, extended in the direction in which the drain bus line 32 crosses the gate bus line 12 and the auxiliary capacitor bus line 14 (e.g., column-wise).

On the gate insulating film 17 with the source electrodes 24, 26, the drain electrodes 28, 30, the drain bus line 32, and the auxiliary capacitor electrode 34, etc. formed on, an insulating film 40 with a contact hole 36 formed down to the source electrode 24 and a contact hole 38 formed down to the auxiliary capacitor electrode 34 is formed.

On the insulating film 40, a pixel electrode 42 is formed. The pixel electrode 42 is connected to the source electrode 24 via the contact hole 36 and to the auxiliary capacitor electrode 34 via the contact hole 38.

An alignment film 44 is formed on the insulating film 40 with the pixel electrode 42 formed on.

On a glass substrate 50 opposed to the glass substrate 10, a color filter 52, a common electrode 54 and an alignment film 56 are formed.

The glass substrate 10 and the glass substrate 50 are arranged with the alignment film 44 and the alignment film 56 opposed to each other, and a liquid crystal 60 is sealed between the alignment films 44, 56.

As described above, the liquid crystal display device according to the present embodiment includes two thin film transistors TFT1, TFT2 for each pixel. The thin film transistor TFT1 is usually used, and the thin film transistor TFT2 is used when the thin film transistor TFT1 is defective.

As shown in FIG. 1, the gate electrode of the thin film transistor TFT1 is formed of the gate bus line 12, and the gate electrode 16 of the thin film transistor TFT2 is connected to the auxiliary capacitor bus line 14. Usually, the gate bus line 12 and the auxiliary bus line 14 are arranged at positions spaced from each other, whereby the thin film transistor TFT1 and the thin film transistor TFT2 can be spaced from each other without sacrificing the aperture ratio. Accordingly, the probability that both thin film transistors TFT1, TFT2 will become concurrently defective can be much decreased.

In the original state in which the liquid crystal display device has not been repaired, as shown in FIG. 3, the thin film transistor TFT2 has the drain electrode 30 connected to the drain bus line 32 and has the gate electrode 16 connected to the auxiliary capacitor bus line. The source electrode 26, however, is connected to nothing. That is, unless repair is made, the thin film transistor TFT2 is unable to function.

However, as shown in FIG. 1, the pattern of the source electrode 26 of the thin film transistor TFT2 and the pattern of the pixel electrode 42 are arranged, partially overlap each other. This is for connecting the source electrode 26 and the pixel electrode 42 with each other by laser repair. That is, in the liquid crystal display according to the present embodiment, the source electrode 26 of the thin film transistor TFT2 and the pixel electrode 42 can be connected with each other by laser repair.

As shown in FIG. 1, between the part of the source electrode 24 of the thin film transistor TFT1, which is connected to the amorphous silicon layer 18 and the part of the source electrode 24, which is connected to the pixel region 42, there is a region where the source electrode 24 does not overlap with the other electrode layers. This is for disconnecting the thin film transistor TFT1 and the pixel electrode 42 from each other by laser repair. That is, in the liquid crystal display device according to the present embodiment, the thin film transistor TFT1 and the pixel electrode 42 can be disconnected from each other by laser repair.

As shown in FIG. 1, between the part of the auxiliary capacitor electrode 34, which is connected to the pixel electrode 42, and the part of the auxiliary capacitor electrode 34, which overlaps the auxiliary capacitor bus line 14, there is provided a region where the auxiliary capacitor electrode 34 and the other electrode layers do not overlap each other. This is for disconnecting the auxiliary capacitor Cs and the pixel electrode 42 from each other. That is, in the liquid crystal display device according to the present embodiment, the auxiliary capacitor Cs and the pixel electrode 42 can be disconnected from each other by laser repair.

Next, the method for repairing the liquid crystal display device according to the present embodiment will be explained with reference to FIGS. 4 and 5.

In the liquid crystal display device according to the present embodiment, as shown in FIG. 4, the pattern of the source electrode 26 of the thin film transistor TFT2 and the pattern of the pixel electrode 42 are arranged, partially overlapping each other. This pattern overlapping portion 70 is a region for the laser beam irradiation for the laser repair.

A laser beam is irradiated to the pattern overlapping portion 70 at the underside of the glass substrate 10 to thereby electrically connect the source electrode 26 and the pixel electrode 42 with each other at the laser beam irradiated portion. Thus, the thin film transistor TFT2 having the gate electrode 16 connected to the auxiliary capacitor bus line 14, the drain electrode 30 connected to the drain bus line 32, and the source electrode connected to the pixel electrode 42 can drive the pixel electrode 42.

Accordingly, even when the thin film transistor TFT1 becomes defective, and the pixel electrode 42 cannot be driven, this repair makes it possible to drive the pixel electrode 42 by using the thin film transistor TFT2.

When the thin film transistor TFT2 is used after repaired, the thin film transistor TFT2 must be driven by the auxiliary capacitor bus line 14. Accordingly, the auxiliary capacitor bus line 14 must be connected to a drive circuit (not shown) to apply a voltage sufficient to turn on the thin film transistor TFT2.

When the thin film transistor TFT1 has, e.g., a short circuit defect between the source and the drain, i.e., a voltage applied to the drain bus line 32 is interlockingly applied to the pixel electrode 42, the stable drive cannot be made by the thin film transistor TFT2 alone. Then, in such case, the electric connection between the thin film transistor TFT1 and the pixel electrode 42 is disconnected by laser repair.

In the liquid crystal display device according to the present embodiment, as shown in FIG. 4, between the part of the source electrode 24, which is connected to the amorphous silicon layer 18, and the part of the source electrode 24, which is connected to the pixel electrode 42, there is provided a region 72 where the source electrode 24 and the other electrode layers do not overlap each other (the dotted line portion in the drawing). Accordingly, a laser beam is irradiated to the region 72 of the source electrode 24 to thereby disconnect the portion of the source electrode 24 connected to the amorphous silicon layer 18 and the portion of the source electrode 24 connected to the pixel electrode 42.

One problem of driving the thin film transistor TFT2. by using the auxiliary capacitor bus line 14 is that the thin film transistor TFT2 is turned off after data has been written in the defective pixel, and when a voltage of the auxiliary capacitor Cs is changed from $V_{ON}$ to $V_{OFF}$, the auxiliary capacitor Cs becomes a parasitic capacitance, and a voltage change $\Delta V$:

$$\Delta V = Cs/(Clc+Cs) \times (V_{ON}-V_{OFF})$$

takes place.

The auxiliary capacitor Cs is comparable to the liquid crystal capacitor Clc, and an approximately 10 V change takes place. Thus, when the repair is made, it is preferable to make the auxiliary capacitor Cs as small as possible.

In the liquid crystal display device according to the present embodiment, as shown in FIG. 4, between the part of the auxiliary capacitor electrode 34, which is connected to the pixel electrode 42, and the part of the auxiliary capacitor electrode 34, which overlaps the auxiliary capacitor bus line 14, there is provided a region 74 where the auxiliary capacitor electrode 34 and the other electrode layer do not overlap each other (the dotted line part in the drawing). Accordingly, a laser beam is irradiated to the region 74 of the auxiliary capacitor electrode 34 from the underside of the glass substrate 10, whereby the portion of the auxiliary capacitor electrode, which is connected to the pixel electrode 42, and the portion of the auxiliary capacitor electrode 34, which overlaps the auxiliary capacitor bus line 14, can be disconnected.

The auxiliary capacitor electrode 34 is thus disconnected, whereby the auxiliary capacitor Cs has only the area of the portion where the pixel electrode 42 and the auxiliary capacitor bus line 14 overlap each other, and the area becomes about ⅟₁₀. The film thickness of the inter-layer film of the auxiliary capacitor Cs is about doubled. As a result, the auxiliary capacitor Cs becomes about ⅟₂₀. From this viewpoint, it is preferable that the area where the pixel electrode 42 and the auxiliary capacitor bus line 14 overlap each other is smaller than the area where the auxiliary capacitor electrode 34 and the auxiliary capacitor bus line 14 overlap each other.

The circuit diagram of the liquid crystal display device having the defective pixel thus repaired is as shown in FIG. 5. In FIG. 5, the x marks indicate parts disconnected by the repair. As shown in FIG. 5, the liquid crystal capacitor Clc and the auxiliary capacitor Cs are disconnected from the thin film transistor TFT1. Then, the liquid crystal capacitor Clc is connected to the thin film transistor TFT2, and the thin film transistor TFT2 becomes operative.

Next, the method for driving the liquid crystal display device according to the present embodiment will be explained with reference to FIGS. 6 and 8.

The present embodiment will be explained by means of the case that a prescribed image is displayed in the liquid crystal display device wherein, as shown in FIG. 6, gate bus lines $G_1$~$G_m$ connected to a gate driver 80, and drain bus lines $D_1$~$D_x$ connected to a data driver 82 are arranged in a matrix, and a pixel connected to the $n^{th}$ gate bus line $G_n$ and the $b^{th}$ drain bus line $D_b$ is a repaired pixel.

First, the coordinates of the repaired pixel are stored in a memory. As shown in FIG. 8, the information of the repaired pixel is in advance stored in a memory (ROM) 92. A signal processing circuit 90 obtains this information from the memory 92 upon the input of the source power and registers this information in the internal memory 90b.

Next, as shown in FIG. 7, a gate pulse is applied from the gate driver 80 sequentially to the gate bus lines $G_1, G_2, \ldots G_m$. Concurrently therewith, a voltage corresponding to information (image gradation data) to be written in the pixels connected to the gate bus lines $G_1, G_2, \ldots G_m$ is sequentially outputted in synchronism with the gate pulses. Thus, the thin film transistors TFT1 connected to the gate bus lines $G_1, G_2, \ldots G_m$ are sequentially turned on, and image information corresponding to a voltage of the drain bus line $D_b$ at this time is written in the associated pixels.

At this time, the signal processing circuit 90, in the processing of outputting image information from a signal source 94 to a liquid crystal panel 96, compares in a correction processing circuit 90a the coordinates of an image to be written with the coordinates of the repaired pixel stored beforehand in the internal memory 90b. When the coordinate of the pixel for a voltage to be written agrees with the coordinate of the repaired pixel stored beforehand in the internal memory 90b, image information (image gradation data) corresponding to the data outputted form the drain bus line Db is obtained and stored in the internal memory 90b.

Thus, the prescribed image information is written in other pixels except the repaired pixel.

Generally, the drive of a liquid crystal display device has a period called a blanking interval for each frame. The blanking interval is a time from the time when a screen has been scanned from one end to the opposite other end to a time when the screen starts to be again scanned from said one end. The blanking interval corresponds to some percent of a total frame time and is far longer than the usual one line writing time.

Here, in the liquid crystal display device according to the present embodiment, a repaired pixel is driven by a thin film transistor TFT2 connected to the auxiliary capacitor bus line. The writing with the auxiliary capacitor bus line turned on must be performed in a time when none of the gate bus lines are not being scanned, preferably in a blanking interval. Thus, in the method for driving the liquid crystal display device according to the present embodiment, the blanking interval is utilized to write image information in a repaired pixel.

In the blanking interval, a voltage is applied to the auxiliary capacitor bus line until the thin film transistor TFT2 is turned on. In this state, the signal processing circuit 90 outputs to the drain bus line $D_b$ a voltage which is based on information stored beforehand in the internal memory 90b as image information to be written in the repaired pixel. Thus, the thin film transistors TFT2 connected to the auxiliary capacitor bus line are sequentially turned on, and image information corresponding to a voltage of the drain bus line $D_b$ at this time is written. In this state, after a certain period time has passed, the voltage of the auxiliary capacitor bus line is changed to a potential sufficient to turn off the thin film transistors TFT2.

Thus, a prescribed display state is written in all the pixels including the repaired pixel.

Upon the writing in the repaired pixel, when a voltage of the auxiliary capacitor bus line is changed, all the pixels connected to the auxiliary capacitor bus line have a voltage change ΔV:

$$\Delta V = Cs/(Clc+Cs) \times (V_{ON} - V_{OFF}).$$

However, the writing is completed, and when the potential of the auxiliary capacitor bus line is returned to the initial potential, the pixel potential is also returned to the initial potential. Accordingly, when a select time for the writing by the use of the auxiliary capacitor bus line is shorter than a response of the liquid crystal, e.g., not more than 1 ms, the display state is never affected.

The blanking interval is so long in comparison with the usual line writing time that even small-sized thin film transistors can write sufficient charges.

How many defective pixels can be repaired changes, depending on how many auxiliary bus lines can be separately driven. In the case that all the auxiliary capacitor bus lines are concurrently turned on and off, one defective pixel per 1 drain bus line can be repaired.

In the circuit constitution shown in FIG. 6, all the auxiliary capacitor bus lines are bundled and are turned on at once on the entire screen. In this case, the control circuit for the auxiliary capacitor bus lines can be made simple, but the number of point defects which can be repaired is only 1 per 1 drain bus line. However, usually the number of the defects of a liquid crystal display device is about 10 at most, which is sufficient in terms of the probability.

Figure 9:
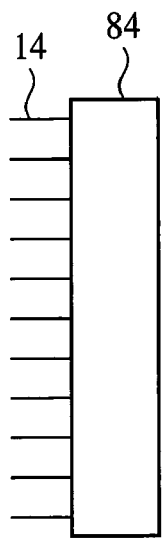
FIGS. 9-12 are views showing the methods of connecting the auxiliary capacitor bus lines in the liquid crystal display device according to the first embodiment of the present invention.

As shown in FIG. 9, the respective auxiliary capacitor bus lines 14 are connected to a drive circuit 84 for driving the auxiliary capacitor bus lines 14 to thereby be respectively driven, whereby a plurality of pixels connected to each drain bus line can be repaired.

Figure 10:
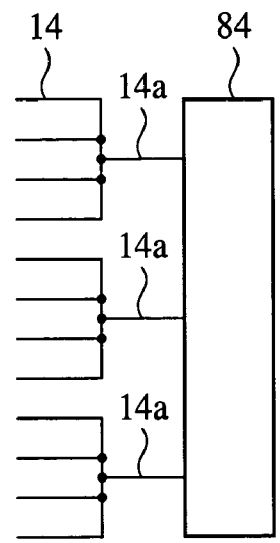

Otherwise, as shown in FIG. 10, the auxiliary capacitor bus lines 14 are collected in bundles of plural ones of them. The respective bundles 14a are connected to the drive circuit 84 for the auxiliary capacitor bus lines to thereby drive the respective bundles 14a, whereby the number of repairable defects can be increased by times a division number. In this case, the drive circuit 84 can be simpler than in FIG. 9.

Figure 11:
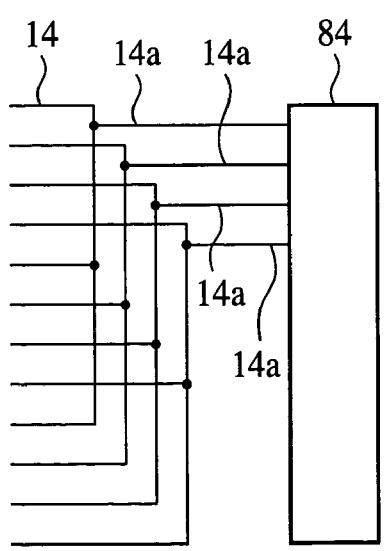

Otherwise, as shown in FIG. 11, the auxiliary bus lines 14 adjacent to each other may be collected in bundles 14a different from each other. Thus, even when adjacent pixels become inoperable due to the same defect, both pixels can be repaired.

Figure 12:
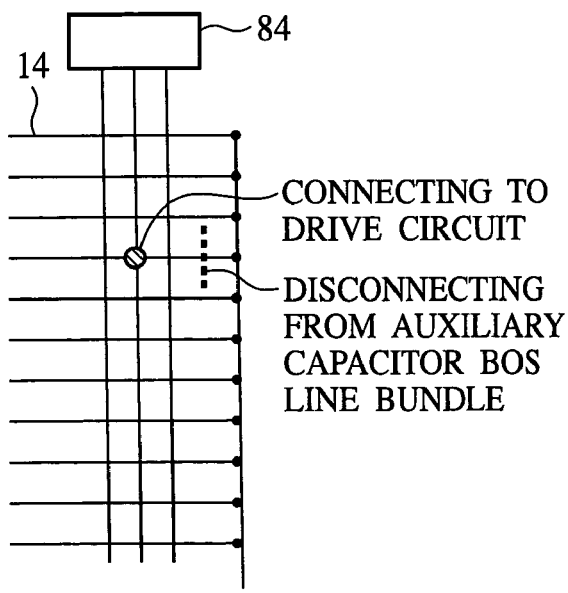

Otherwise, as shown in FIG. 12, an arbitrary auxiliary capacitor bus line 14 is made capable of being disconnected from other auxiliary capacitor bus lines 14 or is made capable of being connected to the drive circuit 84, whereby the auxiliary capacitor bus line 14 of the row including a defective pixel is disconnected from the bundle of auxiliary capacitor bus lines 14, and the disconnected auxiliary capacitor bus line 14 is connected to the drive circuit 84, so as to make only the auxiliary capacitor bus line 14 connected to the repaired pixel operative.

As described above, according to the present embodiment, when a thin film transistor becomes defective, the thin film transistor can be replaced by a spare thin film transistor connected to the auxiliary capacitor bus line, whereby the defective pixel can be used as a perfectly normal point. The spare thin film transistor, which is connected to the auxiliary capacitor bus line, is spaced from the thin film transistor connected to the gate bus line, which prevents both thin film transistors from becoming defective due to the same cause. The aperture ratio decrease can be prevented.

In the liquid crystal display device according to the present embodiment, the auxiliary capacitor and the pixel electrode are capable of being disconnected from each other by laser repair, whereby the auxiliary capacitor and the pixel electrode are disconnected from each other to thereby much decrease the voltage change in the repaired pixel. Accordingly, the display state can be stable.

A Second Embodiment

The liquid crystal display device, the method for repairing the liquid crystal display device, and the method for driving the liquid crystal display device according to a second embodiment of the present invention will be explained with reference to FIGS. 13 to 17. The same members of the present embodiment as those of the liquid crystal display device according to the first embodiment shown in FIGS. 1 to 12 are represented by the same reference numbers not to repeat or to simplify their explanation.

Figure 13:
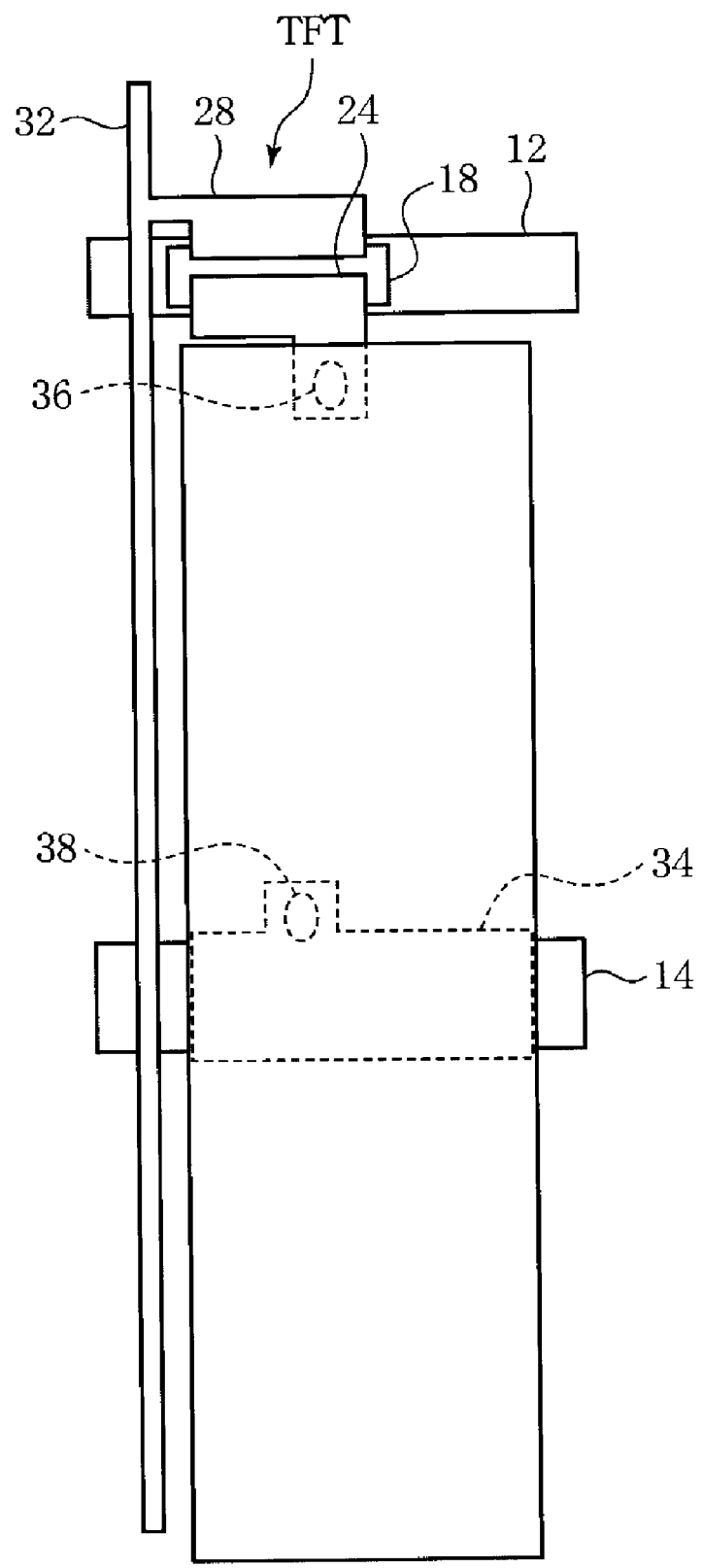
FIG. 13 is a plan view of the liquid crystal display device according to a second embodiment of the present invention, which shows a structure thereof.
Figure 14:
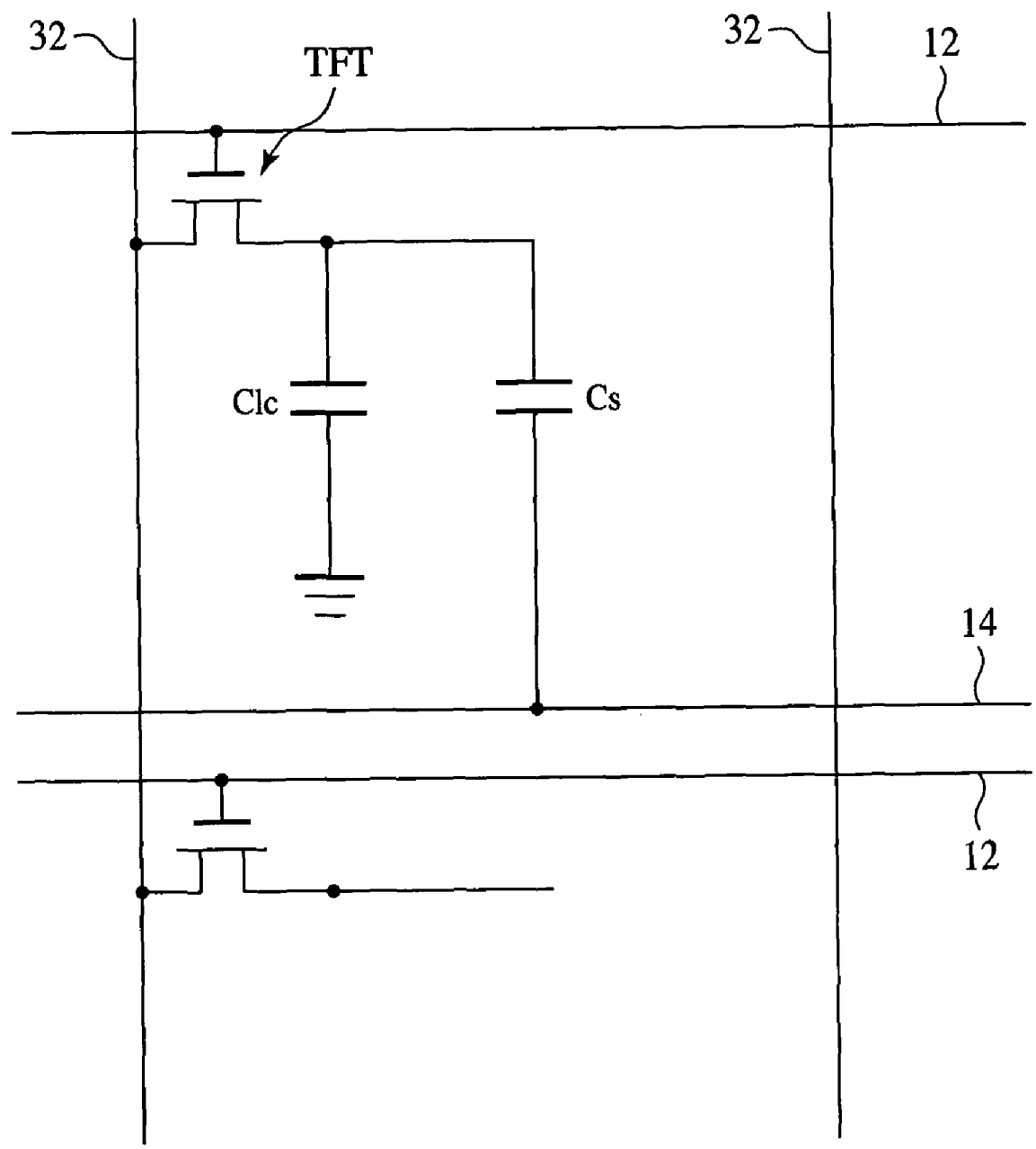
FIG. 14 is a circuit diagram of the liquid crystal display device before repaired according to the second embodiment of the present invention.
Figure 15:
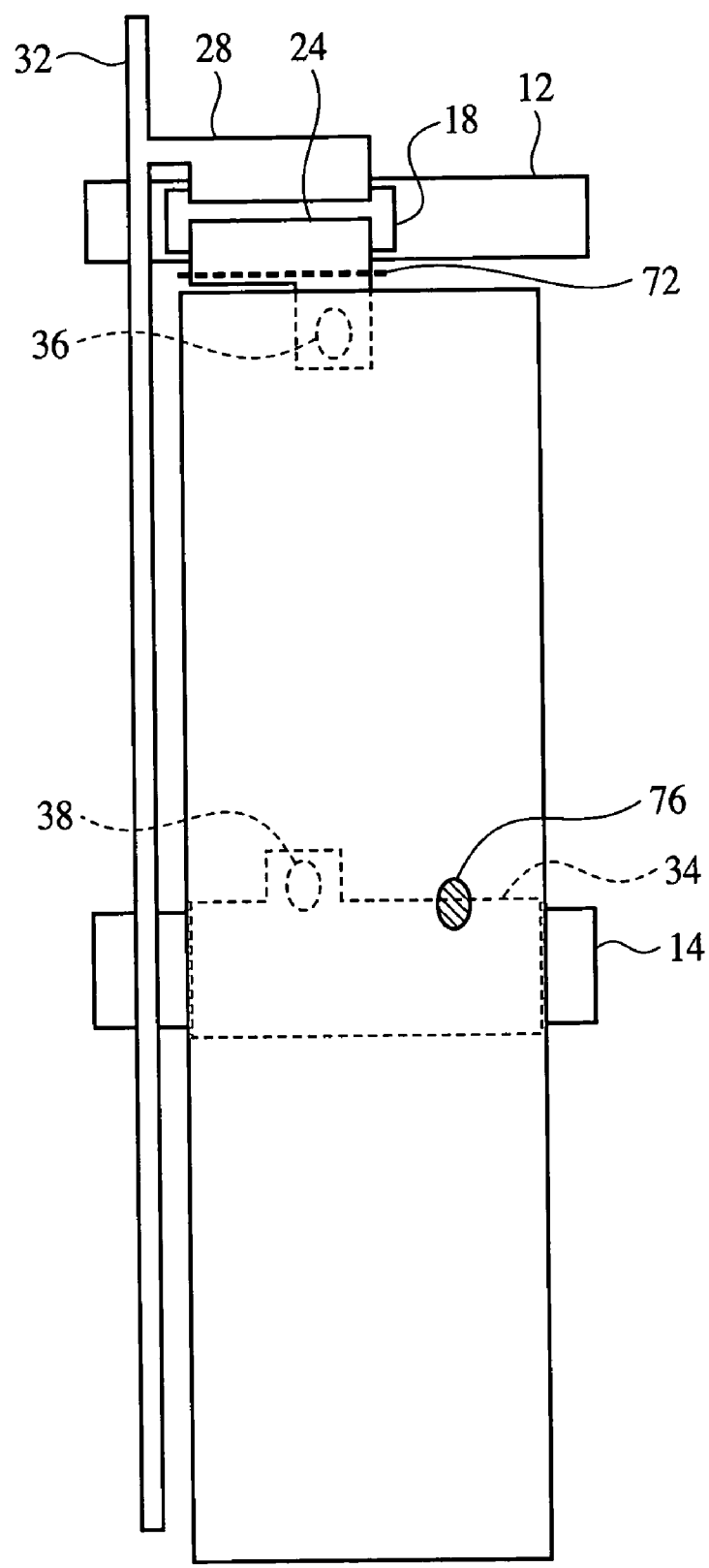
FIG. 15 is a plan view of the liquid crystal display device after repaired according to the second embodiment of the present invention, which shows a structure thereof.
Figure 16:
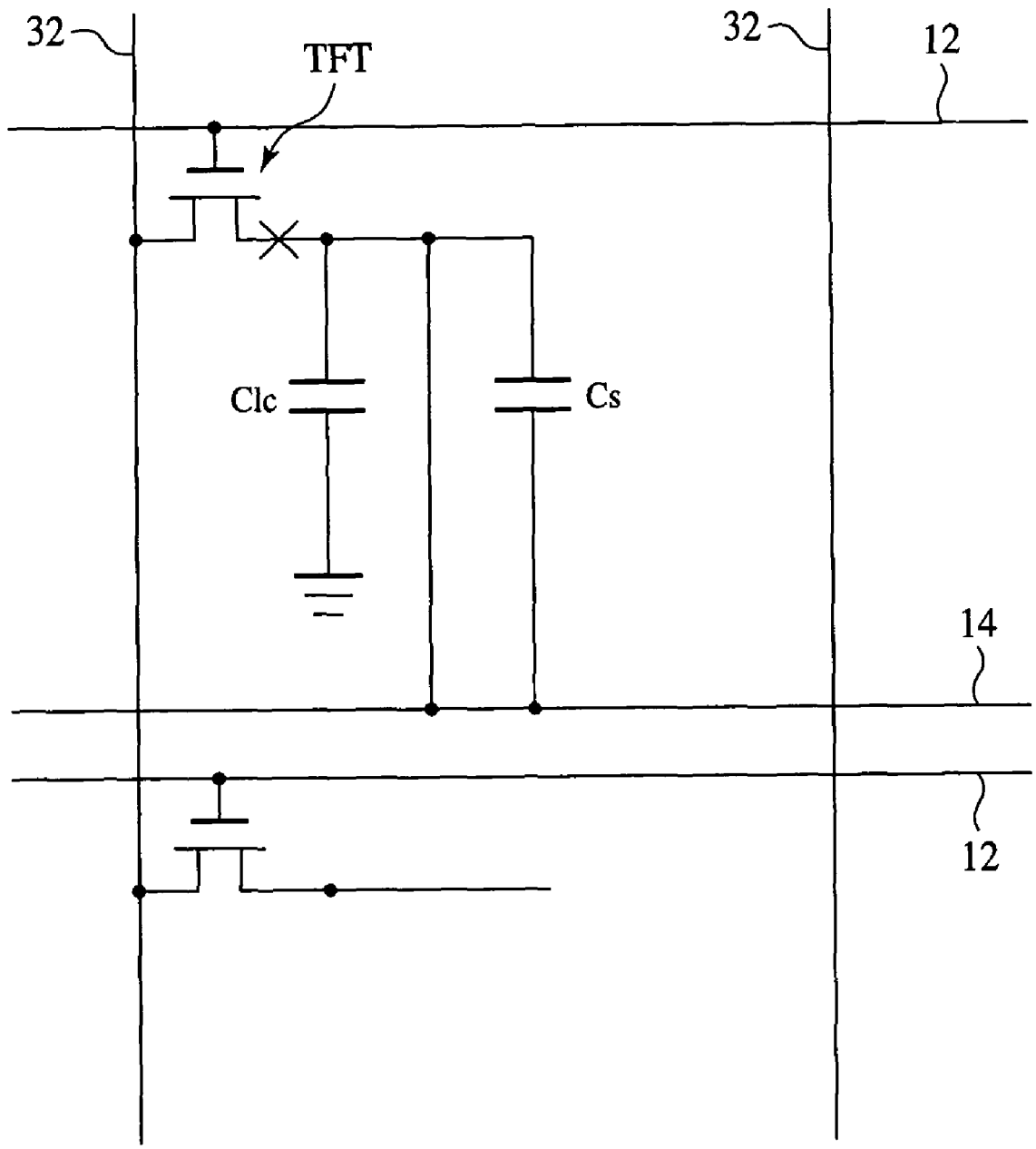
FIG. 16 is a circuit diagram of the liquid crystal display device after repaired according to the second embodiment of the present invention.
Figure 17:
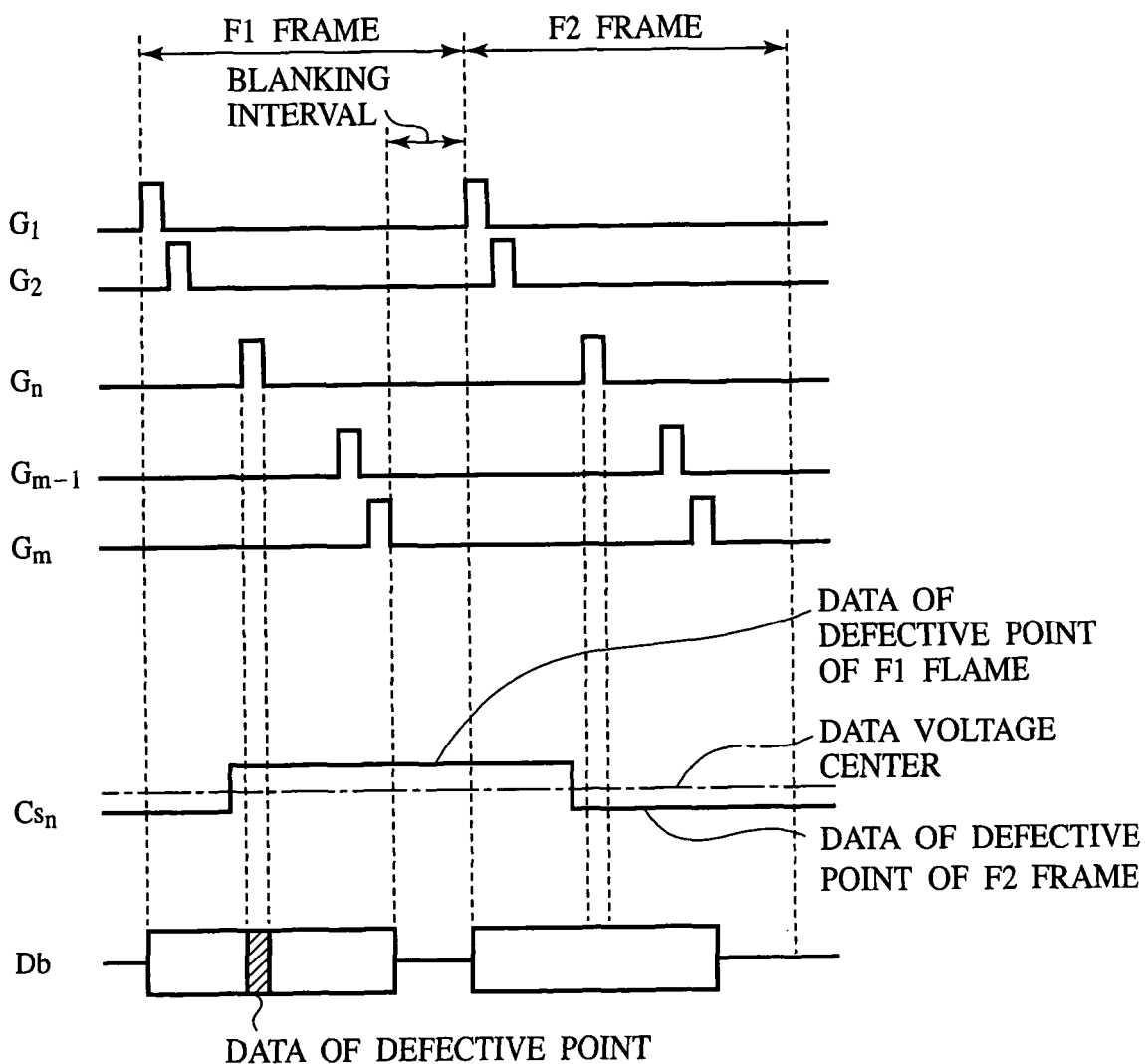
FIG. 17 is a time chart of the method for driving the liquid crystal display device according to the second embodiment of the present invention.

FIG. 13 is a plan view of the liquid crystal display device according to the present embodiment, which shows a structure thereof. FIG. 14 is a circuit diagram of the liquid crystal display device before repaired according to the present embodiment. FIG. 15 is a plan view of the liquid crystal display device after repaired according to the present embodiment, which shows a structure thereof. FIG. 16 is a circuit diagram of the liquid crystal display device after repaired according to the present embodiment. FIG. 17 is a time chart of the method for driving the liquid crystal display device according to the present embodiment.

First, the structure of the liquid crystal display device according to the present embodiment will be explained with reference to FIGS. 13 and 14. The sectional structure of the liquid crystal display device according to the present embodiment is basically the same as that of the liquid crystal display device according to the first embodiment shown in FIG. 2, and see FIG. 2.

On a glass substrate 10, gate bus line 12 and auxiliary capacitor bus line 14 are formed. As shown in FIG. 13, the gate bus line 12 and the auxiliary capacitor bus line 14 are formed, extended in the same direction. A gate insulating film 17 is formed on the glass substrate 10 with the gate bus line 12 and the auxiliary capacitor bus line 14 formed on.

On the gate insulating film 17, an amorphous silicon layer 18 which is to be the channel of the thin film transistor TFT is formed. A channel protection layer 22 is formed on the amorphous silicon layer 18.

On the gate insulating film 17 with the amorphous silicon layer 18 and the channel protection layer 22 formed on, the source electrode 24 of the thin film transistor TFT, the drain electrode 28 of the thin film transistor TFT, the drain bus line 32 continuous to the drain electrode 28, and auxiliary capacitor electrodes 34 formed over the auxiliary capacitor bus line 14 are formed. The drain bus line 32 is formed, crossing the gate bus line 12 and the auxiliary capacitor bus line 14.

On the gate insulating film 17 with the source electrode 24, the drain electrode 28, the drain bus line 32, the auxiliary capacitor electrode 34, etc. formed on, an insulating film 40 with contact holes 36 and contact holes 38 formed respectively down to the source electrode 24 and the auxiliary capacitor electrode 34 is formed.

A pixel electrode 42 is formed on the insulating film 40. The pixel electrode 42 is connected to the source electrodes 24 via the contact hole 36 and to the auxiliary capacitor electrode 34 via the contact holes 38.

An alignment film 44 is formed on the insulating film 40 with the pixel electrode 42 formed on.

A color filter 52, a common electrode 54 and an alignment film 56 are formed on a glass substrate 50 opposed to the glass substrate 10.

The glass substrate 10 and the glass substrate 50 are arranged with the alignment film 44 and the alignment film 56 opposed to each other, and a liquid crystal 60 is sealed between the alignment films 44, 56.

As described above, in the liquid crystal display device according to the present embodiment, which is different from the liquid crystal display device according to the first embodiment, the thin film transistor for driving the pixel is provided 1 for each pixel. As shown in FIG. 14, the liquid crystal display device according to the present embodiment before being repaired is the same in the circuit constitution as the usual liquid crystal device.

As shown in FIG. 13, in the liquid crystal display device according to the present embodiment, between the portion of the source electrode 24 of the thin film transistor TFT, which is connected to the amorphous silicon layer 18, and the portion of the source electrode 24 connected to the pixel electrode 42, there is provided a region where the source electrode 24 does not overlap with other electrode layers. This is for disconnecting the thin film transistor TFT and the pixel electrode 42 by laser repair. That is, in the liquid crystal display device according to the present embodiment, the thin film transistor TFT and the pixel electrode 42 are capable of being disconnected by laser repair.

As shown in FIG. 13, the pattern of the auxiliary capacitor electrode 34 and the pattern of the auxiliary capacitor bus line 14 are arranged, overlapping each other. This is for interconnecting the auxiliary capacitor bus line 14 and the pixel electrode 42 with each other by laser repair. That is, in the liquid crystal display device according to the present embodiment, the auxiliary capacitor bus line 14 and the pixel electrode 42 are capable of being interconnected with each other by laser repair.

Next, the method for repairing the liquid crystal display device according to the present embodiment will be explained with reference to FIGS. 15 and 16.

As shown in FIG. 15, in the liquid crystal display device according to the present embodiment, between the part of the source electrode 24 connected to the amorphous silicon layer 18 and the part of the source electrode 24 connected to the pixel electrode 42, there is provided a region 72 where the source electrode 24 does not overlap with other electrode layers (the dotted line part in the drawing).

Accordingly, by irradiating laser beam to the region 72 of the source electrode 24 from the underside of the glass substrate 10, the region 72 between the part of the source electrode 24 connected to the amorphous silicon layer 18 and the part of the source electrode 14 connected to the pixel electrode 42 is disconnected. When the thin film transistor TFT becomes defective, the thin film transistor TFT and the pixel electrode 42 can be disconnected from each other by such repair.

However, the defective pixel cannot be repaired only by disconnecting the thin film transistor TFT and the pixel electrode 42 from each other. Then, in the method for repairing the liquid crystal display device according to the present embodiment, the pixel electrode 42 is connected to the auxiliary bus line 14 to remedy the defective pixel.

In the liquid crystal display device according to the present embodiment, as shown in FIG. 11, the pattern of the auxiliary capacitor electrode 34 and the pattern of the auxiliary capacitor bus line 14 overlap each other in a pattern overlapping part 76. A laser beam is irradiated to the pattern overlapping part 76 from the underside of the glass substrate 10 to thereby electrically connect the auxiliary capacitor bus line 14 and the pixel electrode 42 with each other via the laser beam irradiated part. Such repair electrically connects the pixel electrode 42 to the auxiliary capacitor bus line 14, whereby the defective pixel can be made operable by the auxiliary capacitor bus line 14.

The circuit diagram of the liquid crystal display device which has the defective pixel thus repaired is shown in FIG. 16. In FIG. 16, the x mark indicates the disconnected part by the repair. As shown in FIG. 16, the repair disconnects the liquid crystal capacitor Clc and the auxiliary capacitor Cs from the thin film transistor TFT. The liquid crystal capacitor Clc is connected to the auxiliary capacitor bus line 14, and is made operable. When the liquid crystal capacitor Clc and the auxiliary capacitor bus line are interconnected with each other, the auxiliary capacitor Cs is shorted.

Next, the method for driving the liquid crystal display device according to the present embodiment will be explained with reference to FIG. 17.

As in the method for driving the liquid crystal display device according to the first embodiment, the method for driving the liquid crystal display device according to the present embodiment will be explained by means of the case that a prescribed image is displayed by the liquid crystal display device in which gate bus lines $G_1 \sim G_m$ connected to a gate driver 80, and drain bus lines $D_1 \sim D_x$ connected to a data driver 82 are arranged in a matrix, and a pixel connected to the $n^{th}$ gate bus line $G_n$ and the $b^{th}$ drain bus line $D_b$ is a repaired pixel (see FIG. 6).

First, in the same way as in the method for driving the liquid crystal display device according to the first embodiment, the coordinates of the repaired pixels are registered in the internal memory 90b of a signal processing circuit 90.

Next, as shown in FIG. 17, a gate pulse is applied from the gate driver 80 sequentially to the gate bus lines $G_1, G_2, \ldots G_m$. Concurrently therewith, a voltage corresponding to information (image gradation data) to be written in the pixels connected to the gate bus lines $G_1, G_2, \ldots G_m$ is sequentially outputted from the drain bus line $D_b$. Thus, the thin film transistors TFT connected to the gate bus lines $G_1, G_2, \ldots G_m$ are sequentially turned on, and image information corresponding to a voltage of the drain bus line $D_b$ at this time is written in the associated pixels.

At this time, the signal processing circuit 90, in the processing of outputting image information from a signal source 94 to a liquid crystal panel 96, compares in a correction processing circuit 90a the coordinate of an image to be written with the coordinate of the repaired pixel stored beforehand in the internal memory 90b. When the coordinate of the pixel for a voltage to be written agree with the coordinate of the repaired pixel stored beforehand in the internal memory 90b, a voltage corresponding to information to be written in the repaired pixel is applied to the auxiliary capacitor bus line $CS_n$ immediately before a gate pulse is applied to the line including the repaired pixel. A voltage is applied to the auxiliary capacitor bus line $CS_n$ so that the luminance of the pixel at the defect point has the original luminance. The voltage applied to the auxiliary capacitor bus line $CS_n$ is retained as it is until new image information is written in the next frame (F2 frame).

Thus, a prescribed display state can be written in all the pixels including the repaired pixel.

As described above, in the method for driving the liquid crystal display device according to the present embodiment, the voltage of the auxiliary capacitor bus line is applied as it is to the pixel electrode of the repaired pixel. Accordingly, it is necessary to apply to the auxiliary capacitor bus line a voltage which makes the transmittance of the pixel equal to the original value.

What is decisively different from the liquid crystal display device according to the first embodiment is that a voltage continues to be applied to the auxiliary capacitor bus line. In consideration of this, it is preferable to change the voltage of the auxiliary capacitor bus line immediately before the writing in the line. When the potential of the auxiliary capacitor bus line is changed by $\Delta Vcs$, the pixels other than the repaired pixel are subjected to a potential change $\Delta V$ of $$\Delta V = Cs/(Clc+Cs) \times \Delta Vcs.$$

When this state is set on, the brightness of the liquid crystal changes to be distributed unevenly. However, a writing immediately follows, and the potential of the auxiliary bus line at this time is fixed until the next writing, without influencing the brightness of the liquid crystal.

The auxiliary capacitor bus lines and the drive circuit for the auxiliary capacitor bus lines can have the same constitution as those of the liquid crystal display device according to the first embodiment shown in FIGS. 9 to 12. In the liquid crystal display device according to the present embodiment, the number of defective pixels which can be remedied is 1 per 1 auxiliary capacitor bus line at most (for the constitution shown in FIG. 9).

As described above, according to the present embodiment, when a thin film transistor becomes operationally defective, the pixel electrode is connected directly to the auxiliary capacitor bus line to be driven, whereby the defective pixel can be used as a perfectly normal point. Furthermore, it is not necessary to provide spare thin film transistors and signal lines, which can prevent the aperture ratio decrease.

Modified Embodiments

The present invention is not limited to the above-described embodiments and can cover other various modifications.

For example, in the first and the second embodiments, the auxiliary capacitor bus line is used to drive the repaired pixel. However, another signal line can be used as long as the signal line can apply a voltage which changes over time, independently of the common electrode.

For example, new bus lines are provided in addition to the gate bus lines and the auxiliary capacitor bus lines, and the new bus lines may be used for driving the repaired pixels. The new bus lines may be formed, extended along the gate bus lines or along the drain bus lines. However, in this case, the aperture ratio of the pixels is decreased, corresponding to the new bus lines.

What is claimed is:

1. A liquid crystal display device comprising:
  a plurality of pixels arranged in a matrix, adjacent to each other row-wise and column-wise;
  a plurality of gate bus lines extended row-wise and connected to the pixels arranged row-wise;
  a plurality of drain bus lines extended column-wise and connected to the pixels arranged column-wise; and
  a plurality of auxiliary capacitor bus lines extended row-wise, connected to the pixels arranged row wise and not connected to the gate bus lines,
  said plurality of the pixels each including:
    a pixel electrode;
    an auxiliary capacitor electrode connected to the pixel electrode, the auxiliary capacitor bus line and the auxiliary capacitor electrode forming an auxiliary capacitor;
    a first switching element connected to the pixel electrode and the drain bus line, for controlling the connection between the pixel electrode and the drain bus line by the gate bus line; and
    a second switching element having a first electrode connected to the drain bus line and a second electrode overlapping the pixel electrode with an insulating film formed therebetween, for controlling the connection between the first electrode and the second electrode by the auxiliary capacitor bus line;
    wherein the second electrode of the second switching element of at least one of said plurality, which is normally operative is not electrically connected to the pixel electrode, and the second electrode of the second switching element of the at least one of said plurality of the pixels, which is not normally operative is electrically connected by laser repair to the pixel electrode at a region where the second electrode overlapping the pixel electrode with the insulating film formed therebetween.

2. A liquid crystal display device according to claim 1, wherein
  an area of a region where the pixel electrode and the auxiliary capacitor bus line overlap each other is smaller than an area of a region where the auxiliary capacitor electrode and the auxiliary capacitor bus line overlap each other.

3. A liquid crystal display device according to claim 1, wherein
  a connection between the auxiliary capacitor electrode and the pixel electrode is capable of being disconnected by irradiation of laser beam.

4. A liquid crystal display device according to claim 1, wherein
  a connection between the first switching element and the pixel electrode is capable of being disconnected by irradiation of laser beam.

5. A liquid crystal display device according to claim 1, wherein
  said plurality of the auxiliary capacitor bus lines are driven as a whole.

6. A liquid crystal display device according to claim 1, wherein
  said plurality of the auxiliary capacitor bus lines are respectively driven.

7. A liquid crystal display device according to claim 1, wherein
  said plurality of the auxiliary capacitor bus lines are divided in a plurality of groups and are driven in the respective groups.

8. A liquid crystal display device according to claim 7, the auxiliary capacitor bus lines contained in each group are not adjacent to each other.

9. A liquid crystal display device according to claim 1, wherein
  said plurality of the auxiliary capacitor bus lines are capable of applying a voltage which independently changes with time to an arbitrary one of said auxiliary capacitor bus lines by irradiation of laser beam.

10. A method for repairing a liquid crystal display device comprising: a plurality of pixels arranged in a matrix, adjacent to each other row-wise and column-wise; a plurality of gate bus lines extended row-wise and connected to the pixels arranged row-wise; a plurality of drain bus lines extended column-wise and connected to the pixels arranged column-wise; and a plurality of auxiliary capacitor bus lines extended row-wise, connected to the pixels arranged row wise and not connected to the gate bus lines,
  said plurality of the pixels each including: a pixel electrode; an auxiliary capacitor electrode connected to the pixel electrode, the auxiliary capacitor bus line and the auxiliary capacitor electrode forming an auxiliary capacitor; a first switching element connected to the pixel electrode and the drain bus line, for controlling the connection between the pixel electrode and the drain bus line by the gate bus line; a second switching element having a first electrode connected to the drain bus line and a second electrode not connected to the pixel electrode but overlapping the pixel electrode with an insulating film formed therebetween, for controlling the connection between the first electrode and the second electrode by the auxiliary capacitor bus line,
  when said plurality of the pixels includes an operative pixel and an inoperative pixel, laser beam being irradiated to a region where the pixel electrode and the second electrode of the second switching element of the inoperative pixel overlapping with each other to thereby electrically connect the pixel electrode and the second electrode of the second switching element of the inoperative pixel with each other, leaving an electrical connection between the pixel electrode and the second electrode of the second switching element of the operative pixel disconnected.

11. A method for repairing a liquid crystal display device according to claim 10, wherein
the connection between the auxiliary capacitor electrode and the pixel electrode is disconnected by irradiation of laser beam.

12. A method for repairing a liquid crystal display device according to claim 10, wherein
a connection between the first switching element and the pixel electrode is disconnected by irradiation of laser beam.

13. A method for driving a liquid crystal display device comprising: a plurality of pixels arranged in a matrix, adjacent to each other row-wise and column-wise; a plurality of gate bus lines extended row-wise and connected to the pixels arranged row-wise; a plurality of drain bus lines extended column-wise and connected to the pixels arranged column-wise; and a plurality of auxiliary capacitor bus lines extended row-wise, connected to the pixels arranged row wise and not connected to the gate bus lines,
said plurality of the pixels each including: a pixel electrode; an auxiliary capacitor electrode connected to the pixel electrode, the auxiliary capacitor bus line and the auxiliary capacitor electrode forming an auxiliary capacitor; a first switching element connected to the pixel electrode and the drain bus line, for controlling the connection between the pixel electrode and the drain bus line by the gate bus line; a second switching element having a first electrode connected to the drain bus line and a second electrode overlapping the pixel electrode with an insulating film formed therebetween, for controlling the connection between the first electrode and the second electrode by the auxiliary capacitor bus line, wherein the second electrode of the second switching element of the pixel which is normally operative is not electrically connected to the pixel electrode, and the second electrode of the second switching electrode of the pixel which is not normally operative is electrically connected by laser repair to the pixel electrode at a region where the second electrode overlapping the pixel electrode with the insulating film formed therebetween,
in the pixel which is normally operative, the first switching element being controlled by the gate bus line to thereby write prescribed image information, and
in the pixel which is not normally operative, the second switching element being controlled by the auxiliary capacitor bus line to thereby write prescribed image information.

14. A method for driving a liquid crystal display device according to claim 13, wherein
a coordinate of a repaired pixel is stored,
data to be written in the repaired pixel is stored, based on the stored coordinate, and
the data is written in the repaired pixel in a period when any of said plurality of the gate bus lines are not selected.

15. A method for driving a liquid crystal display device according to claim 14, wherein
the period is a blanking interval.

* * * * *

UNITED STATES PATENT AND TRADEMARK OFFICE
CERTIFICATE OF CORRECTION

| | | |
|---|---|---|
| PATENT NO. | : 7,978,165 B2 | Page 1 of 1 |
| APPLICATION NO. | : 11/063081 | |
| DATED | : July 12, 2011 | |
| INVENTOR(S) | : Kamada | |

It is certified that error appears in the above-identified patent and that said Letters Patent is hereby corrected as shown below:

Claim 1, Col. 15, Line 55   After "plurality," insert --of the pixels--.

Signed and Sealed this
Tenth Day of April, 2012

David J. Kappos
*Director of the United States Patent and Trademark Office*